United States Patent [19]
Karol

[11] Patent Number: 5,416,769
[45] Date of Patent: May 16, 1995

[54] CONTROLLED-FEEDBACK PACKET SWITCHING SYSTEM

[75] Inventor: Mark J. Karol, Fair Haven, N.J.

[73] Assignee: AT&T Corp., Murray Hill, N.J.

[21] Appl. No.: 90,732

[22] Filed: Jul. 13, 1993

[51] Int. Cl.[6] ............... H04J 14/08; H04L 12/56
[52] U.S. Cl. ........................... 370/60; 370/85.6; 370/94.1; 340/825.5; 359/117; 359/140
[58] Field of Search .............. 370/15, 16, 54, 56, 370/60, 60.1, 61, 65, 65.5, 85.2, 85.6, 94.1; 340/825.5, 825.51, 825.52; 359/115, 117, 135, 140; 395/425

[56] References Cited

U.S. PATENT DOCUMENTS

| | | | |
|---|---|---|---|
| 4,472,801 | 9/1984 | Huang | 370/60 |
| 4,761,780 | 8/1988 | Bingham et al. | 370/60 |
| 4,866,701 | 9/1989 | Giacopelli et al. | 370/60 |
| 4,879,712 | 11/1989 | Littlewood | 370/60 |
| 4,891,803 | 1/1990 | Huang et al. | 370/60 |
| 4,893,304 | 1/1990 | Giacopelli et al. | 370/60 |
| 5,126,999 | 6/1992 | Munter et al. | 370/85.6 |
| 5,233,606 | 8/1993 | Pashan et al. | 370/85.6 |

OTHER PUBLICATIONS

T.-C. Hou and D. M. Lucantoni, "Buffer Sizing for Synchronous Self-Routing Broadband Packet Switches with Bursty Traffic," International Journal of Digital and Analog Cabled Systems, vol. 2, No. 4, pp 253–260, Oct.-Dec., 1989.

M. Hirano and N. Watanabe, "Characteristics of a Cell Multiplexer for Bursty ATM Traffic," ICC'89 Conf. Rec., pp. 399–403, Jun., 1989.

L. Dittmann and S. B. Jacobsen, "Statistical Multiplexing of Identical Bursty Sources in an ATM Network," Globecomm'88 Conf. Rec., pp. 1293–1297, Nov., 1988.

M. J. Karol, "Queueing in Optical Packet Switches," SPIE vol. 1787: Multigigabit Fiber Communication (1992), pp. 192–203, Sep., 1992.

M. J. Karol, M. G. Hluchyj, and S. P. Morgan, "Input Versus Output Queueing on a Space-Division Packet Switch," IEEE Trans. Commun., vol. COM-35, pp. 1347–1356, Dec., 1987. (Also in GLOBECOM'86 Conf. Rec., pp. 659–665, Dec., 1986).

M. G. Hluchyj and M. J. Karol, "Queueing in High-Performance Packet Switching," IEEE Jour. Select. Areas Commun., vol. 6, No. 9, pp. 1587–1597, Dec., 1988.

T. Kozaki, Y. Sakurai, O. Matsubara, M. Mizukami, M. Uchida, Y. Sato, and K. Asano, "32×32 Shared Buffer Type ATM Switch VLSIs for B-ISDN," ICC'91, Conf. Rec., pp. 711–715, Jun., 1991.

A. Huang and S. Knauer, "Starlite: A Wideband Digital Switch," GLOBECOM'84 Conf. Rec., pp. 121–125, Nov., 1984.

Z. Haas, "The Staggering Switch: An Almost-All Optical Packet Switch," OFC'92 Tech. Digest, p. 133, Feb., 1992.

K. Y. Eng, et al., "A High-Performance Prototype 2.5 Gb/s ATM Switch for Broadband Applications," GLOBECOM'92 Conf. Rec., pp. 111–117, Dec., 1992.

*Primary Examiner*—Alpus Hsu
*Attorney, Agent, or Firm*—John A. Caccuro

[57] ABSTRACT

Packets or cells received from different input ports of a switch and destined for a common output port of that switch, are analyzed to determine their priority level. Lower-priority packets or cells are buffered in recirculation delay lines of appropriately-selected lengths, and thereafter scheduled for transmission to the output port based on their level of priority.

14 Claims, 3 Drawing Sheets

CONTROLLED-FEEDBACK PACKET SWITCHING SYSTEM

TECHNICAL FIELD

This invention relates to switching systems. More specifically, this invention relates to the scheduling of packet delivery in a switching system.

BACKGROUND

Because of the unscheduled nature of arrivals of packets or ATM cells to a packet switching system, two or more packets may simultaneously arrive on different inputs destined for the same output. The switch architecture may allow one of these packets to pass through to the output, but the others must be queued for later transmissions. This temporary congestion caused by simultaneous arrival of packets or cells is typically handled by temporarily storing the packets or cells in buffers. For traffic distributions that are random or more or less uniform, buffering requirements are rather lenient. However, for high performance packet switching systems designed to handle bursty traffic, the buffering requirements are more stringent.

For electronic packet switches, buffering is ordinarily implemented in a random access memory (RAM) that is typically shared by all the inputs and outputs of the switch in order to reduce memory storage requirements. In optical packet switches, the present lack of an optical random access memory significantly complicates buffering in those optical switches. Approaches that have been considered for buffering in optical switches include an implementation that involves the routing of queued packets to trap lines that retard the transmission of the queued input packets to the desired output, thereby allowing other input packets destined for the same output to be transmitted during the delay period. However, this approach presents certain drawbacks that prevent its use in optical and optoelectronic packet switches. Specifically, certain scheduling functions needed for the orderly and timely switching and transmission of packets are not performed in the trap line approach. For example, the trap line approach (unlike the RAM approach) does not permit changes to the "scheduled" transmission time of lower-priority packets when higher-priority packets arrive later.

Another approach that has been advocated for buffering packets in optical switches is the so-called "feed-forward" technique in which packets contending for an output port are delayed by different numbers of time slots to avoid collision with previously scheduled packets. In that approach, packets are dropped if they cannot be scheduled in a collision-free manner. This approach, however, does not allow transmission time to be updated on a slot-by-slot basis and does not adequately support priority traffic.

Thus, there is a need for a packet buffering system for use in optical and optoelectronic packet switches which offers the same performance and functionality provided by a RAM in electronic packet switches.

SUMMARY

This invention is directed to a packet switch in which incoming packets or cells destined for a common output port are analyzed to determine their priority level. Lower-priority packets or cells are buffered in recirculation delay lines of appropriately-selected lengths, and thereafter are scheduled for transmission to the output ports based on their level of priority.

In a specific example of the invention, a memoryless non-blocking switch is designed to include an input-/output section comprised of a certain number of input ports and output ports and a certain number of recirculation delay lines of various lengths connected to dedicated input and output ports for buffering packets. The switch also includes control circuitry that determines which packets need to be buffered in the recirculation delay lines and schedules the delivery of the buffered packets based on their priority level. The control circuitry also keeps packets in their proper first-in, first-out sequence, supports multiple levels of priority traffic, and ensures that packets pass through the recirculation delay lines only a small number of times to minimize power losses, thereby avoiding the need for optical amplifiers in the delay lines in most cases. If amplifiers are used, a reduced number of lines through which a packet has to travel results in a proportional decrease in amplifier noise.

In another example of the invention, a packet switching system is partitioned into multiple, memoryless, non-blocking switches that are either connected to recirculation delay lines or to the output ports of the packet switching system. The first group of switches are called a "delay-line switches" while the second are called an "output switches". Delay-line and output switches are front-ended by routers which receive commands from a control circuitry to direct packets from input ports to either a delay-line switch when the packets must be queued or to an output switch when no queuing is required.

DETAILED DESCRIPTION

Figure 1:
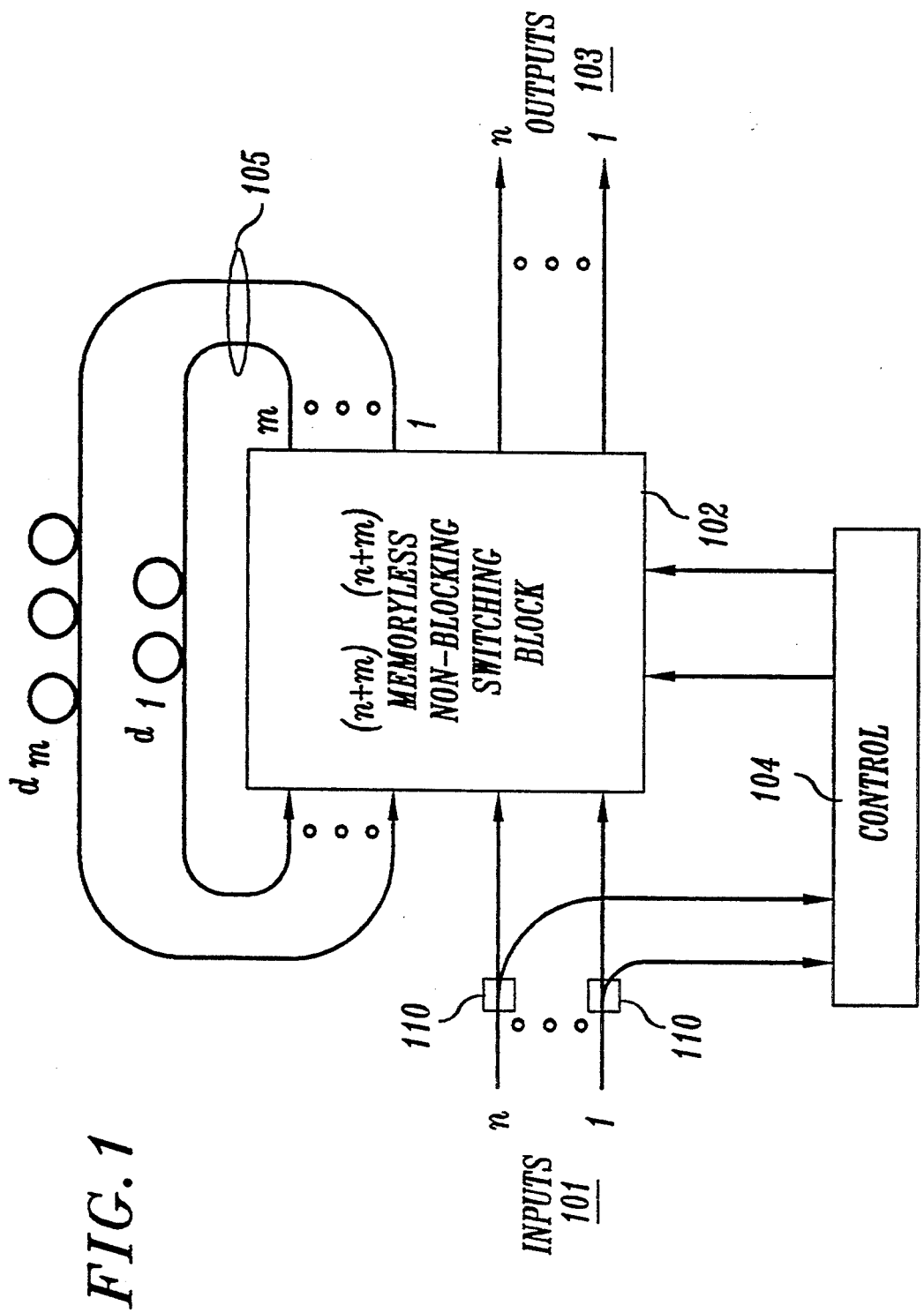
FIG. 1 illustrates a packet switch designed in accordance with the invention to schedule delivery of lower-priority packets based on their priority level and to buffer packets in recirculation delay lines of appropriately-selected lengths.

FIG. 1 illustrates an example of a packet switch which schedules delivery of packets based on their priority level. The packet switch of FIG. 1 also buffers lower-priority packets in recirculation delay lines of appropriately-selected lengths. FIG. 1 shows a block diagram of a n×n packet switch comprising a) n input lines 101-1 to 101-n b) n output ports 103-1 to 103-n c) m recirculation delay lines (of appropriately-selected lengths) 105-1 to 105-m for buffering packets d) an (n+m)×(n+m) memoryless, non-blocking switching block 102, and e) a control circuit 104 which reconfigures the switching block 102 on a packet-by-packet basis. In FIG. 1, packets arrive at the input lines 101-1 to 101-n of the switching block 102. While switching block 102 can be a strictly non-blocking switching block, it is preferably a rearrangeably non-blocking switching block. For optical implementations, input lines 101-1 to 101-n may be fiber lines. When there is no contention for the output ports, packets received from input lines 101-1 to 101-n are transmitted to the appropriate output ports 102-1 to 102-n based on the packet headers that indicate the destination point for each packet. The header of a packet is read by control 104 which uses power splitters 110-1 to 110-n to tap a small fraction of the packet energy to read the header. To determine the appropriate configuration of the switching block 102, control 104 keeps track of all packets buffered in the recirculation delay lines 105-1 to 105-m, so that it knows which packets will be returning to the switching block 102 at what times. Control 104 may be implemented using, for example, a microprocessor which executes programming instructions described below.

FIG. 1 shows that the recirculation delay lines 105-1 to 105-m have lengths $d_1, d_2, \ldots,$ and $d_m$. The lengths of those lines are expressed in units equal to the number of packets that they respectively can store end-to-end. In order to explain the interaction between switching block 102, control 104 and recirculation lines 105-1 to 105-m, it is assumed in this example, (without loss of generality, and for the sake of simplicity) that $d_1 \leq d_2 \leq \ldots \leq d_m$. For illustrative purposes, special attention is devoted to the case in which $d_1=1, d_2=2, \ldots,$ and $d_m=m$. Since a total of $B \triangleq (d_1+d_2+\ldots+d_m)$ packets can be stored in the recirculation delay lines 105-1 to 105-m, it follows that $B=m(m+1)/2$ when $d_1=1$, $d_2=2, \ldots,$ and $d_m=m$. It is further assumed that switching block 102 and control circuit 104 use a time-slotted system in which, for each time slot, up to $(n+m)$ packets may arrive at the switch (i.e., n new arrivals plus m "recirculation packets"). Of these packets, up to n can be transmitted to their appropriate output ports; the rest are "buffered" in the recirculation delay lines 105-1 to 105-m. A packet that is buffered in a recirculation delay line of length $d_i$ will exit that delay line and return to switching block 102 after $d_i$ time slots. Control 104 selects which packets to output for each time slot, and also assigns the remaining packets to the recirculation delay lines. More specifically, control 104 assigns packets to the appropriate delay lines in a way such that "buffer locations" in the delay lines are efficiently utilized, and packets retain their proper first-in, first-out sequence, as needed. Control 104 also ensures that each packet circulates through the delay lines 105-1 to 105-m only a small number of times. This last property is very important, because it may help to keep the power losses low enough to reduce, and perhaps eliminate, the need for optical amplifiers in the recirculation delay lines 105-1 to 105-m. If amplifiers are needed in the recirculation delay lines 105-1 to 105-m, minimization of the number of recirculations helps keep the added noise sufficiently small. In addition, if the power budget does indicate the need for amplifiers in the recirculation delay lines 105-1 to 105-m, the reduction in the number of lines translates into a valuable reduction in the number of amplifiers.

It may be important to note that many different technologies can potentially be used for an optical implementation of the switch illustrated in FIG. 1. For example, technologies such as guided-wave using lithium niobate; or perhaps Wavelength Diversion Multiplexing (WDM) and star couplers; or even wavelength routers can be used to build such a switch. In addition, the delay-line function that is performed in this example by the recirculation delay lines 105-1 to 105-m can be implemented using, for example, optical fiber lines or other appropriate optical transmission means. As to the control circuitry 104, it can more easily be implemented using a microprocessor even though it is also possible to use optical logic gates to design such a circuit in an optical implementation.

Figure 2:
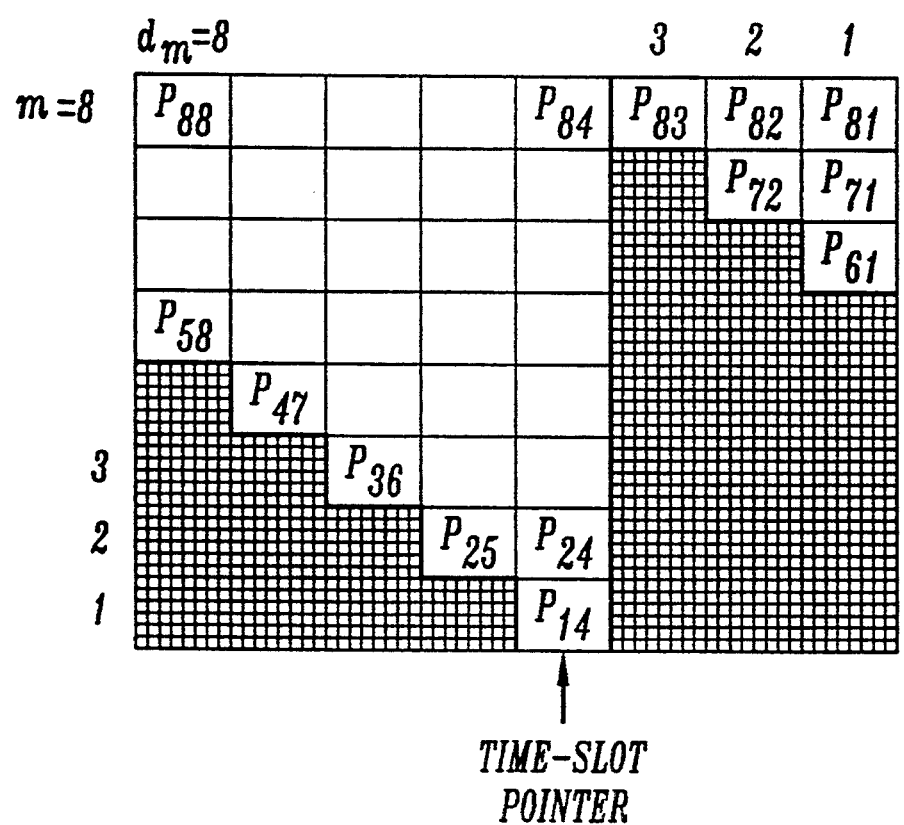
FIG. 2 shows one example of a control table which keeps track of packets in the recirculation delay lines of FIGS. 1 and 3.

FIG. 2 shows one exemplary structure of a control table which is arranged to keep track of packets in the recirculation delay lines of FIG. 1 described above and FIG. 3 described below.

In order to free control circuit 104 of FIG. 1 of the task of reading (for each time slot) the headers of all packets exiting the recirculation delay lines 105-1 to 105-m, control circuitry 104 maintains a table of information about the packets stored in the recirculation delay lines 105-1 to 105-m. FIG. 2 illustrates one possible way for control 104 to store information about the buffered packets. As mentioned above, this information (e.g., the packets' output port addresses) is obtained by reading the packet headers when they first arrive to the switching block 102. This information is kept in the control table of FIG. 2 until the packet exits the switching block 102. In this example, the table of FIG. 2 is an $m \times d_m$ table in an (electronic) RAM, that operates at the packet rate and that is arranged to mimic the flow of packets through the recirculation delay lines 105-1 to 105-m. Each row in the table corresponds to one of the m delay lines (m=8 in FIG. 2). Each column contains information corresponding to the set of packets that will exit the delay lines at the same time and arrive together for routing through the switching block 102. The time-slot pointer shown at the bottom of FIG. 2 cyclically shifts to the left one column per time slot to indicate the current set of (up to) m recirculation packets now returning to switching block 102. The shaded portion of the $m \times d_m$ table corresponds to unused entries (for a given position of the time-slot pointer). When a packet is buffered in a recirculation delay line, information about that packet is moved in the control table of FIG. 2 to the appropriate position along the "diagonal" ($P_{14}$ for delay line 1, $P_{25}$ for delay line 2, $P_{36}$ for delay line 3, ..., or $P_{83}$ for delay line 8). The amount of information associated with each of these $P_{ij}$ entries depends on the particular implementation of control 104, as illustrated by the following two examples.

In an illustrative non-FIFO (First-In First-Out) control implementation, the control 104 first routes as many of the packets to their outputs as possible for each time slot. In sequence, it considers the recirculation packets (beginning at the longest delay line and moving towards the shortest delay line), and then considers the new packet arrivals. If there are multiple priorities, higher-priority packets are handled first. Whenever a packet cannot be routed to its output port j (because another packet has already been selected for routing to output j), then the packet is sent to the shortest delay line that has the fewest packets destined for that output j "in that column" of the Control Table of FIG. 2. Since at most one packet per output can be transmitted for each time slot, this last factor helps "load balance" the output addresses over the table's columns.

In an illustrative FIFO-control implementation, for each time slot, the new packet arrivals and the recirculation packets are either (i) routed to the appropriate output ports for transmission, (ii) "scheduled" for transmission after one more recirculation, or (iii) left "unscheduled" and sent to a delay line for another recirculation. Each $P_{ij}$ entry in the control table keeps track of (i) the input-output ports of each packet in the recirculation delay lines, and (ii) whether or not the packet is scheduled for transmission the next time it reaches the switching block 102. There also is a FIFO table associated with each input-output pair. The FIFO keeps a first-in, first-out list of all packets of this input-output pair, the exact location of these packets in the recirculation delay lines and in which (if any) future time slots they are scheduled for transmission. Finally, a "timestamp" is given to each packet when it first arrives to the switching block 102. The timestamp corresponds to the transmission time of an ideal output-queuing switch, and represents the packet's "anticipated transmit time."

Using this information about each packet, the Control schedules packets for transmission in the current time slot or future time slots. First, it routes any "scheduled packets" on the recirculation delay lines to the appropriate output ports. Second, it checks if any of the new arrivals can be routed to their outputs (without violating the FIFO constraint). Third, it schedules packets, if possible, for transmission after their next recirculation (on the shortest possible delay line). A packet can be scheduled only if the packet before it in its input-output FIFO has already been scheduled. Priority in this scheduling is given to packets with the smallest timestamp ("anticipated transmit time"), and to recirculation packets on the longest delay lines. Once a packet is scheduled, this may also indirectly allow other packets waiting in the same input-output FIFO to be scheduled without violating the FIFO constraint. Finally, any remaining packets are left unscheduled and are recirculated to the delay lines. Starting with unscheduled packets having the smallest timestamp, packets are sent to the shortest delay line that has the fewest packets destined for that output in that column of the control table of FIG. 2.

Other contention resolution schemes considered include routing a packet to an output port (as opposed to a recirculation delay line) based on the position of the input port from which the packet is received when that packet is contending for an output port with another packet of equal priority level. Likewise, a packet received from a recirculation delay line dedicated input port may be routed to an output port when another packet received simultaneously from a "regular" input port is contending for the same output port. In that case, in accordance with the principles of the invention, the other packet would be routed to a recirculation delay line.

Figure 3:
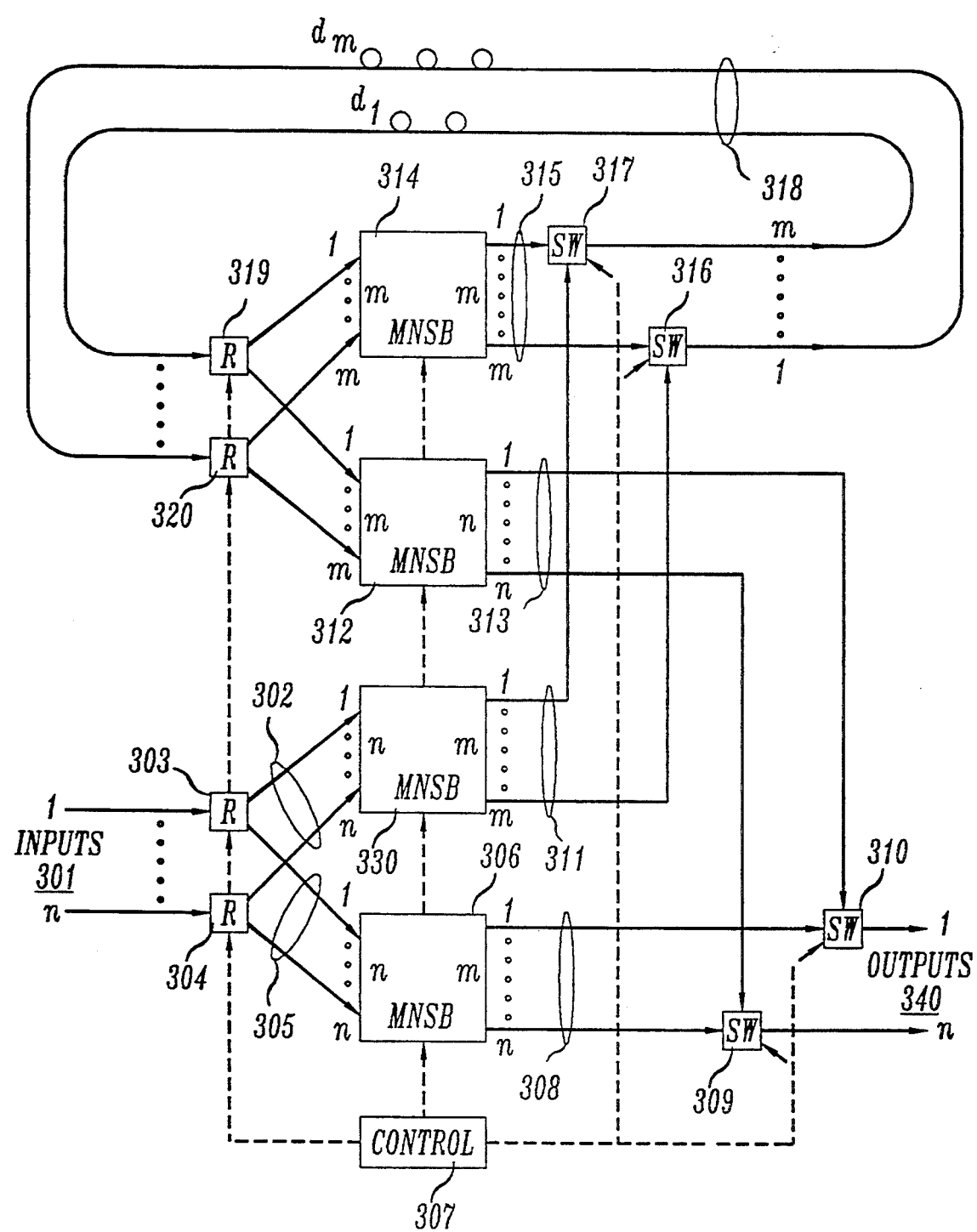
FIG. 3 shows an illustrative packet switching system that is partitioned into multiple switches front-ended by routers.

FIG. 3 shows an illustrative packet switching system that is partitioned into multiple switches front-ended by routers. The modular design, illustrated in FIG. 3, partitions a packet switch into a "memory block" comprised of memoryless non-blocking switching blocks (MNSB) 306, 312, 314, and 330, delay lines 318-1 to 318-m, and an input/output section comprised of input lines 301-1 to 301-n and output ports 340-1 to 340-n, respectively. In FIG. 3, the $(n+m) \times (n+m)$ switch of FIG. 1 is configured as $n \times n$, $n \times m$, $m \times n$, and $m \times m$ MNSBs, plus a number of routers 303, 304, 319, 320 and optional rear-end switches 309, 310, 316 and 317 for certain implementations.

The packet switching system that is illustrated in the block diagram of FIG. 3 includes routers 303, 304, 320 and 319 that directs packets to either a delay-line MNSB, such as MNSB 314 (330) or an output MNSB such as MNSB 312 (306). Each MNSB is connected to n routers that receive incoming packets from input lines 301-1 to 303-n or m routers that receive recirculated packets from recirculation delay lines 318-1 to 318-m. In an optical implementation of the packet switching system of FIG. 3, routers 303 and 304 also perform a power splitting function that allows a control 307 to tap a small fraction of a packet's energy to read that packet's header. The packet switching system that is illustrated in the block diagram of FIG. 3 shares some common elements with the packet switch shown in FIG. 1. For example, the packet switching system of FIG. 3 uses a) the same set of recirculation delay lines shown in FIG. 1, and b) a similar control structure, albeit with a slightly more distributed implementation. Thus, the control table illustrated in FIG. 2 is readily applicable to the modular design of FIG. 3.

As is the case for the switch of FIG. 1, the Control 307 is responsible for all routing decisions, including deciding which delay lines buffer which packets. For example, when multiple incoming packets destined for the same output port are received by routers 303 or 304 from input lines 301-1 to 301-n, the headers of these packets are read by control 307 which decides the proper treatment for the received packets using, for example, the scheduling techniques described above. As part of that decision, control 307 determines which packet among the received packets to send to the appropriate output port based on the priority level of the packets. The selected packet to be routed to the output port is sent to MNSB 306 which promptly forwards that packet to rear-end switch 309 or 310 via line 308. Rear-end switch is used in optical implementations of the packet switching system of FIG. 3 to prevent energy loss that could result from the use of other types of devices. When a packet has to be buffered, control 307 sends a signal to router 303 or 304 to forward that packet to MNSB 330 which in turn sends the packet to the delay line indicated by control 307.

Advantageously, buffering packets in the recirculation delay lines (105-1 to 105-m in FIG. 1 or 318-1 to 318-m in FIG. 3) offers flexibility and efficiency not possible with other techniques. For example, if first-in first-out requirements dictate that an arriving packet cannot be transmitted for at least k time slots (because other packets are queued for the same output), then, it is advantageous to store that packet in a recirculation delay line of length k (if possible) and transmit that packet in due time. Even if the packet cannot be buffered in a delay line of length k, "optimal performance" may still be possible since there may be many combinations of delay-line lengths that sum to k. For example, an optimal (i.e., minimal) delay of 10 time slots can be attained by buffering a packet in a delay line of length 10, or by buffering it successively in delay lines of length 7 and 3, or successive delay lines of length 6, 1, and 3, etc. Furthermore, recirculation permits "scheduling decisions" to be revised each time a packet returns to the switch from the feedback delay lines (e.g., to allow for quicker transmission of new higher-priority packets).

I claim:
1. A packet switching system comprising:
at least one switching block having a plurality of input and output ports;
a control circuit for determining a) priority levels of packets received by the input ports and b) delivery time of packets to the output ports;
a plurality of recirculation delay elements, each one of which is connected to a dedicated input port and a dedicated output port; and
means for buffering a lower-priority packet which is contending for an output port with one or more higher-priority packets, in a selected one of the recirculation delay elements based on the priority level of the lower-priority packet as determined by the control circuit.

2. The invention of claim 1 wherein said buffering means comprises:
   means for routing the lower-priority packet to one or more recirculation delay elements until the lower-priority packet is no longer in contention for the output port with at least one higher-priority packet; and
   means for keeping track of all packets routed to all recirculation delay elements.

3. The invention of claim 2 further comprising:
   means for limiting the number of times a lower-priority packet is routed to one or more recirculation delay elements.

4. The invention of claim 1 wherein when two packets of identical priority levels are a) received concurrently from two separate input ports, and b) destined for a single output port, one of the two packets is arbitrarily chosen to be buffered in a selected recirculation delay element.

5. The invention of claim 1 wherein the recirculation delay elements have differing lengths and wherein a particular recirculation delay element is selected to buffer a packet based on the priority level of the packet and the length of the recirculation delay element.

6. The invention of claim 5 wherein lower-priority packets are buffered in longer recirculation delay elements and higher-priority packets are buffered in shorter recirculation delay elements.

7. The invention of claim 1 further comprising
   means for keeping all packets routed to an output port of the switching block in a first-in-first-out sequence.

8. Apparatus for use in a packet switching system comprising:
   means for determining the level of priority of incoming packets received from different input ports of the packet switching system and destined for a common output port of the packet switching system;
   means for routing the highest priority packet to the output port;
   means for buffering in selected ones of a plurality of recirculation delay lines lower-priority packets; and
   means for scheduling delivery to the output port of the lower-priority packets buffered in the recirculation delay lines based on their determined level of priority.

9. The apparatus of claim 8 wherein the buffering means comprises:
   means for routing at least once the lower-priority packets to one or more recirculation delay lines.

10. The invention of claim 8 further comprising:
    means for limiting the number of times a lower-priority packet can be routed to one or more recirculation delay lines.

11. A method of routing packets in a switch comprising:
    determining levels of priority of incoming packets received from different input ports of the switch and destined for a common output port of the switch;
    routing the highest priority packet to the output port;
    buffering in selected ones of a plurality of recirculation delay lines lower-priority packets; and
    scheduling delivery to the output port of the lower-priority packets buffered in the recirculation delay lines based on their determined level of priority.

12. A packet switching system comprising:
    a switching fabric having at least one switching block with a plurality of input and output ports;
    a plurality of recirculation delay elements, each one of which is connected to a dedicated input port and a dedicated output port of the switching fabric;
    a control circuit for a) determining levels of priority of packets received from the input ports, and b) selecting one of the recirculation delay elements through which, one or more lower-priority packets contending for one of the output ports with one or more higher priority packets is returned to the switching fabric at least once.

13. The invention of claim 12 further comprising:
    means for routing a packet to an output port when the packet is in contention for the output port with another packet of equal priority level.

14. The invention of claim 12 further comprising:
    means for routing a packet to an output port based on the position of the input port from which said packet is received when said packet is in contention with another packet of equal priority level.

* * * * *